(12) United States Patent
Park et al.

(10) Patent No.: US 10,281,671 B2
(45) Date of Patent: May 7, 2019

(54) COMBINED HYBRID CABLE HOUSING AND SPLITTER (71) Applicant: Halliburton Energy Services, Inc., Houston, TX (US)

(72) Inventors: Brian Vandellyn Park, Spring, TX (US); Michael Edwin Pollard, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 10 days.

(21) Appl. No.: 15/544,461

(22) PCT Filed: Feb. 27, 2015

(86) PCT No.: PCT/US2015/017991
§ 371 (c)(1),
(2) Date: Jul. 18, 2017

(87) PCT Pub. No.: WO2016/137489
PCT Pub. Date: Sep. 1, 2016

(65) Prior Publication Data
US 2017/0363830 A1 Dec. 21, 2017

(51) Int. Cl.
G02B 6/44 (2006.01)
E21B 47/01 (2012.01)
(Continued)

(52) U.S. Cl.
CPC .......... *G02B 6/4448* (2013.01); *E21B 17/023* (2013.01); *E21B 17/028* (2013.01);
(Continued)

(58) Field of Classification Search
CPC .. G02B 6/4448; G02B 6/3897; G02B 6/4416; G02B 6/4454; E21B 17/028;
(Continued)

(56) References Cited

U.S. PATENT DOCUMENTS 7,641,395 B2 1/2010 Ringgenberg et al.
2007/0237467 A1* 10/2007 Rubinstein ........... G02B 6/2553
385/99

(Continued)

OTHER PUBLICATIONS

International Patent Application No. PCT/US2015/017991, "International Search Report and Written Opinion", dated Oct. 30, 2015, 14 pages.

*Primary Examiner* — Jerry M Blevins
(74) *Attorney, Agent, or Firm* — Kilpatrick Townsend & Stockton LLP (57) ABSTRACT An assembly can include a barrel housing having an opened end. The barrel housing can also include a barrel port for mounting a first compression fitting. A racetrack tray can be positioned within the barrel housing. The racetrack tray can receive an optical fiber and an electrical cable of a hybrid cable. A cap can be secured to the opened end of the barrel housing. The cap can include a cap port for receiving a second compression fitting. A primary seal can be positioned in a groove on one of the cap or the barrel housing. The primary seal can create a pressure seal between the cap and the barrel housing.

20 Claims, 5 Drawing Sheets (51) Int. Cl.
E21B 47/12 (2012.01)
E21B 17/02 (2006.01)
G02B 6/38 (2006.01)
H01B 11/22 (2006.01)
H01R 13/516 (2006.01)
H02G 3/04 (2006.01)
H02G 15/23 (2006.01)
E21B 47/06 (2012.01)

(52) U.S. Cl.
CPC ............ *E21B 47/01* (2013.01); *E21B 47/011* (2013.01); *E21B 47/123* (2013.01); *G02B 6/3897* (2013.01); *G02B 6/4416* (2013.01); *G02B 6/4454* (2013.01); *H01B 11/22* (2013.01); *H01R 13/516* (2013.01); *H02G 3/0437* (2013.01); *H02G 15/23* (2013.01); *E21B 47/065* (2013.01)

(58) Field of Classification Search
CPC ..... E21B 47/065; H01B 11/22; H01R 13/516; H02G 3/0437; H02G 15/23
USPC .......................................................... 385/135
See application file for complete search history.

(56) References Cited

U.S. PATENT DOCUMENTS

| | | |
|---|---|---|
| 2008/0073084 A1 | 3/2008 | Ringgenberg et al. |
| 2010/0303426 A1 | 12/2010 | Davis |
| 2011/0135247 A1 | 6/2011 | Achara et al. |
| 2011/0217017 A1* | 9/2011 | Drouard ................. H02G 3/088 385/135 |
| 2011/0266008 A1 | 11/2011 | Worrall, Jr. et al. |
| 2014/0219620 A1* | 8/2014 | Jaaskelainen ........ G02B 6/4471 385/135 |

* cited by examiner

COMBINED HYBRID CABLE HOUSING AND SPLITTER

CROSS-REFERENCE TO RELATED APPLICATIONS

This is a U.S. national phase under 35 U.S.C. 371 of International Patent Application No. PCT/US2015/017991 titled "Determining Characteristics Of A Fluid In A Wellbore" and filed Nov. 11, 2015, the entirety of which is incorporated herein by reference.

TECHNICAL FIELD

The present disclosure relates generally to optical fibers and electrical cables utilized in oil and other wells and other extreme environments. More specifically, but not by way of limitation, this disclosure relates to assemblies for housing splices of optical fibers and electrical cables.

BACKGROUND

A well system (e.g., oil or gas wells for extracting fluids from a subterranean formation) can include sensors and gauges positioned downhole for sensing conditions within the wellbore (e.g., temperature, pressure, vibrations, etc.). A splice housing can receive an optical fiber ("fiber") for connection to an optical sensor or gauge. The fiber can be fixed at either end of a splice tray of the splice housing assembly. The length of the fiber within the splice housing can be approximately the same length as the splice tray. The splice housing, including the splice tray, and the fiber can increase in temperature when downhole. The splice housing and splice tray can expand in length much greater than the fiber, for example due to differences in the thermal expansion of metal and glass. This can create stress in the fiber, which can affect the optical properties of the signal, or in some cases can cause the fiber to break.

A splice housing can also have a secondary Y-splitter attached to the end of the splice housing to break out a fiber for connection to a sensor (e.g., a pressure sensor). The addition of the secondary Y-splitter can increase the length of the mandrel used to mount the splice housing. An increase in the length of the mandrel can increase costs associated with machining the mandrel.

DETAILED DESCRIPTION

Certain aspects and examples of the disclosure are directed to a splice housing assembly that can receive a hybrid cable. The hybrid cable can have an outer tubing that can carry a fiber in metal tube (FIMT). The FIMT can have an inner metal tube that can house multiple optical fibers ("fiber(s)"). The hybrid cable can also contain multiple electrical cable wires ("electrical cable(s)"). The splice housing assembly can include multiple ports to facilitate connection of the fibers and the electrical cables to multiple downhole devices (e.g., sensors and gauges). The multiple ports can omit the need for a separate Y-splitter, which can reduce the length of the splice housing assembly. The splice housing assembly can also house various combinations of end terminations and inline splices for different types of fibers, as well as electrical connectors.

The splice housing assembly can include a racetrack tray that can retain additional lengths of fiber. The splice housing assembly can expand at a greater rate than the fiber when exposed to high temperatures. Retaining excess lengths of fiber within the racetrack tray can prevent stress or breakage of the fiber at high temperatures. The additional lengths of fiber can make splices easier to make or repair at the rigsite, which can reduce costs.

Figure 1:
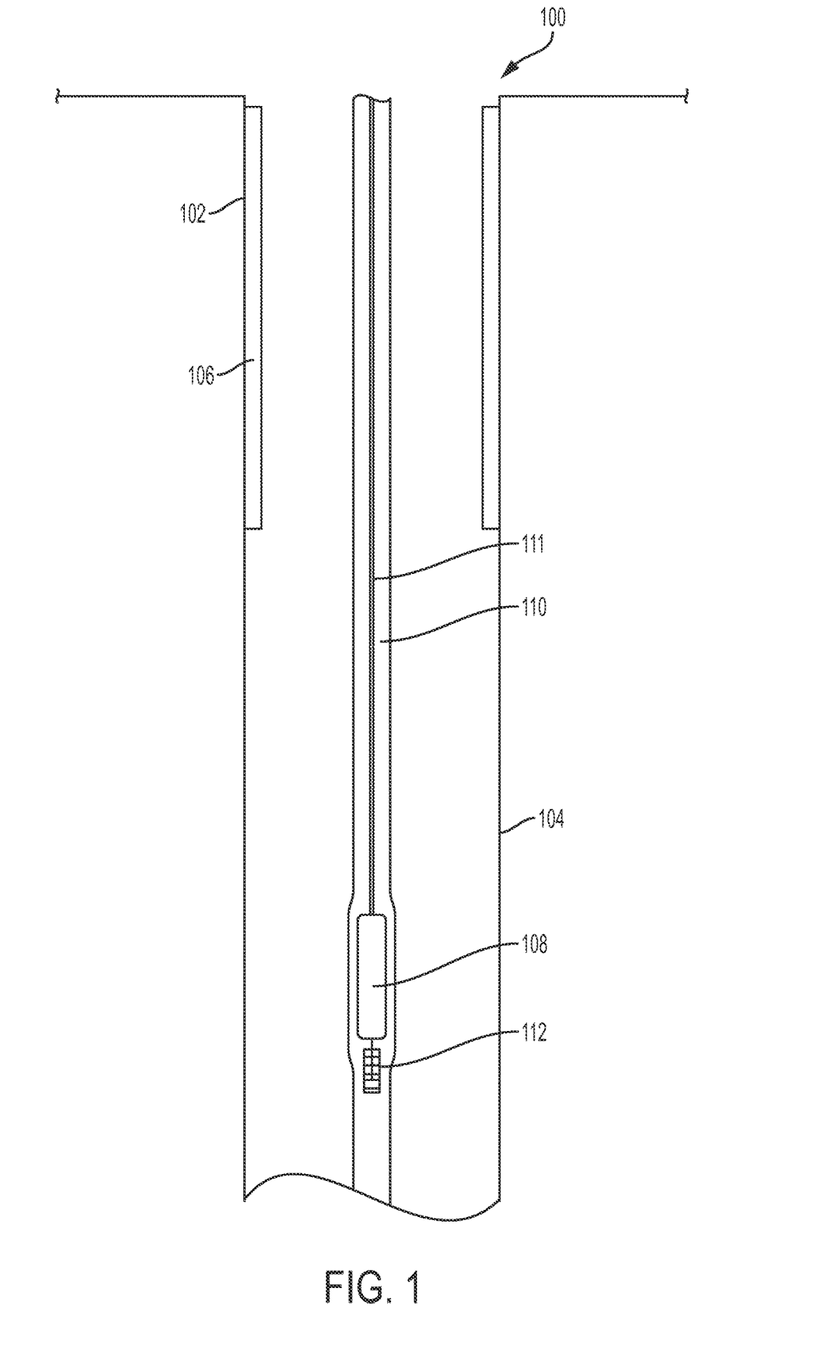
FIG. 1 is a schematic illustration of a well system including a splice housing assembly positioned on a mandrel downhole, according to an aspect of the present disclosure.

FIG. 1 is a schematic illustration of a well system 100 that includes a bore that is a wellbore 102 extending through various earth strata. The wellbore 102 has a substantially vertical section 104 that may include a casing string 106 cemented at an upper portion of the substantially vertical section 104. A splice housing assembly 108 can be positioned on a mandrel 110 (or a carrier body) that is downhole in the wellbore 102. A hybrid cable 111 can extend from the surface to the splice housing assembly 108, though other types of cables can be used (e.g., an electrical cable, an optical fiber, etc.). The hybrid cable 111 can contain a FIMT. The FIMT can house multiple fibers within the inner metal tube. The fibers within the FIMT can be multi-mode fibers, single-mode fibers, or a combination of multi-mode fibers and single-mode fibers. The hybrid cable 111 can also include electrical cables. The splice housing assembly 108 can connect a fiber or an electrical cable of the hybrid cable 111 to a downhole sensor 112. In some aspects, the splice housing assembly 108 can connect multiple fibers and electrical cables of the hybrid cable 111 to various downhole sensors and gauges. In some aspects, the splice housing assembly 108 can house an end termination for a distributed temperature sensing (DTS) fiber, a distributed acoustic sensing (DAS) fiber, or another fiber application. The splice housing assembly can also house an inline splice for a DTS fiber, a DAS fiber, or another fiber application.

Figure 2:
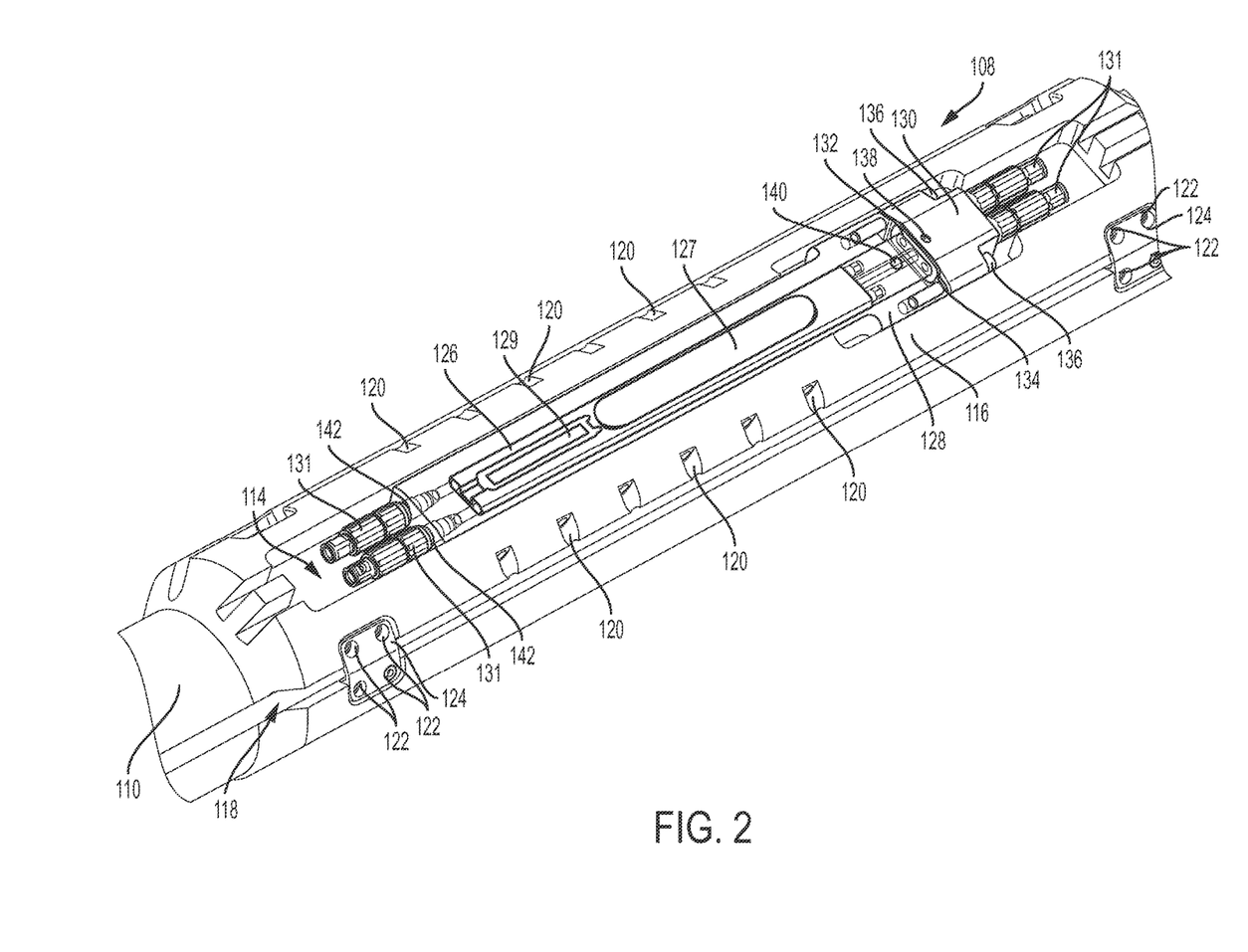
FIG. 2 is an isometric view of the splice housing assembly mounted on the mandrel, according to an aspect of the present disclosure.

FIG. 2 is an isometric view of the splice housing assembly 108 of FIG. 1 positioned on the mandrel 110, according to an aspect of the present disclosure. The mandrel 110 can include an enlarged portion 116 that has an offset diameter. The enlarged portion 116 can be an oval shape or other suitable shape having on offset diameter that can minimize the total width of the mandrel 110. The enlarged portion 116 can include a recess 114. The splice housing assembly 108 can be positioned within the recess 114. The hybrid cable 111 is not shown in FIG. 2.

In some aspects, the mandrel 110, including the enlarged portion 116, can include a groove 118 that extends along the length of the mandrel 110. The groove 118 can receive a cable that bypasses the splice housing assembly 108. The cable can be retained within the groove 118 by plates 124 positioned over the cable and the groove 118. The plates 124 can be secured to the mandrel 110 by threaded fasteners 122. In some aspects, the cable could be retained within the groove 118 by means other than the plates 124 and threaded fasteners 122.

The splice housing assembly 108 can be secured within the recess 114 of the enlarged portion 116 of the mandrel 110 by set screws 120 or other suitable attachment means. The splice housing assembly 108 can be shipped separate from the mandrel 110 and can be installed in the recess 114 of the enlarged portion 116 of the mandrel 110 by personnel at the well site. The recess 114 can be slightly longer than the splice housing assembly 108. In some aspects, the recess 114 can extend approximately two inches or more on either side of the installed splice housing assembly 108. The recess 114 being larger than the splice housing assembly 108 can allow the splice housing assembly 108 to be more easily installed within the recess 114 at the well site.

The splice housing assembly 108 can include a racetrack tray 126. The racetrack tray 126 can be rectangular, oval, oblong, or another suitable shape. The racetrack tray 126 can include a cavity (or recess) 127. In some aspects, the cavity 127 can be oval or oblong in shape. Fiber from the FIMT can be loosely wound and retained within the cavity 127. The cavity 127 can facilitate placing and retaining the fiber within the racetrack tray 126. In some aspects, angled walls can extend from a surface of the racetrack tray 126 into the cavity 127. The angled walls of the cavity 127 can assist in retaining the fiber within the cavity 127 of the racetrack tray 126. The loose winding of the fiber can provide an excess length of fiber that can compensate for thermal expansion. The excess length of the fiber can prevent stressing or breaking of the fiber. Having additional lengths of fiber in the cavity 127 of the racetrack tray 126 can accommodate subsequent changes to the fiber splices. The racetrack tray 126 can also permit crossovers for the fiber so that it can be routed in opposite directions. In some aspects, different lengths of the various fibers of the FIMT can be retained in the recess 127 of the racetrack tray 126. The racetrack tray 126 can also provide space for various fiber splices or electrical cable connections.

An electrical connector, such as a crimp butt connector 129 can also be coupled to the racetrack tray 126. The crimp butt connector 129 can connect the electrical cable to a gauge or a sensor. In some aspects, another type of electrical connector can be used instead of the crimp butt connector 129. For example, a double crimp butt connector can be used to connect the electrical cable to both a gauge and an electrical wiring pass-through.

Fibers and electrical cables from the sensors, gauges, and hybrid cables can be passed into the splice housing assembly 108. The fibers and electrical cables passed into the splice housing 108 can be separated from each other upon entry in the splice housing assembly 108. For example, the fibers can be separated from the electrical cables and positioned within the cavity 127 of the racetrack tray 126. The electrical cables can separated from the fibers and can extend along the length of the racetrack tray 126 for connection to the crimp butt connector 129 or other electrical connector. In some aspects, the cavity 127 can be positioned on a top surface of the racetrack tray 126 and the crimp butt connector 129 can be positioned on a bottom surface of the racetrack tray 126. The racetrack tray 126 can also include a second cavity that can receive and retain an additional length of the electrical cable. The second cavity can be positioned proximate to the crimp butt connector 129. Additional lengths of electrical cable can accommodate subsequent changes to electrical cable connections.

The racetrack tray 126 can be positioned within a pressure-tight, barrel racetrack housing 128 that covers and protects the racetrack tray 126 and other elements of the splice housing assembly 108. The barrel racetrack housing 128 can be machined from one end. A cap and arm assembly 130 can be secured to the machined end of the barrel racetrack housing 128 by threaded fasteners 136 (e.g., cap screws).

The cap and arm assembly 130 can include a c-seal 132 positioned within a groove. The barrel racetrack housing 128 can include a test c-seal 134 positioned within a groove. The c-seal 132 can be smaller than the test c-seal 134. The c-seal 132 can be positioned within the test c-seal 134 when the splice housing assembly 108 is assembled. The c-seals 132, 134 can create metal-to-metal surface seals. The c-seals 132, 134 may be self-energizing seals that can be positioned so that each of the c-seals is facing towards the direction of higher pressure. With the c-seals 132, 134 positioned this way, the c-seals 132, 134 can increase their sealing capacity against the cap and arm assembly 130 and the barrel racetrack housing 128 as the pressure increase.

The c-seal 132 can provide a pressure seal between the cap and arm assembly 130 and the barrel racetrack housing 128. The test c-seal 134 can provide the ability to pressure test the assembly. In some aspects, the test c-seal 134 can also aid in providing the pressure seal between the cap and arm assembly 130 and the barrel racetrack housing 128. The cap and arm assembly 130 can include a pressure test port 138 that can provide the ability to pressure test the c-seals 132, 134 after assembly of the splice housing assembly 108. For example, a pressure can be applied to the space between the c-seals 132, 134 via the pressure test port 138.

The barrel racetrack housing 128 can also include a fill port 140. A cavity formed by the barrel racetrack housing 128 can be filled with a fluid via the fill port 140. The fluid can prevent the gel from inside the FIMT from leaking into the splice housing assembly 108. In some aspects, the fluid can be pressurized. The barrel racetrack housing 128 can also include two ports 142. The cap and arm assembly 130 can also include two ports (not visible in FIG. 2). In some aspects, the barrel racetrack housing 128 and the cap and arm assembly 130 can include a different number of ports. A cable, a gauge, or a sensor can be connected to the splice housing assembly 108 via FMJ connectors 131 mounted at the ports of the barrel racetrack housing 128 and the cap and arm assembly 130. The cable can be a hybrid cable, an electrical cable, an optical fiber, or other type of cable. Other suitable pressure testable compression fittings can be used in place of FMJ connectors 131.

While the barrel racetrack housing 128 and the cap and arm assembly 130 each include two ports, other numbers and locations of ports can be used based on the requirements of a particular installation. A port may be plugged when it is not used, or in some aspects not even machined when the assembly 108 is manufactured. In some aspects, the use of a separate Y-splitter can be omitted by having multiple ports in the cap and arm assembly 130 and the barrel racetrack housing 128. Omitting the use of the separate Y-splitter can reduce the length of the splice housing assembly 108 and can simplify the installation of the splice housing assembly 108. Reducing the length of the splice housing assembly 108 can also reduce the length of mandrel used for mounting the splice housing assembly 108. Reducing the length of the mandrel can reduce costs.

In some aspects, in which an internal pressure measurement is needed, the splice housing assembly 108 can be mounted to a mandrel that can include a gauge mounted to a port that passes through the wall of the mandrel to the interior of the mandrel. In other aspects, the splice housing assembly 108 can be either mounted to a mandrel or clamped to a collar.

Figures 3A, 3B, 3C:
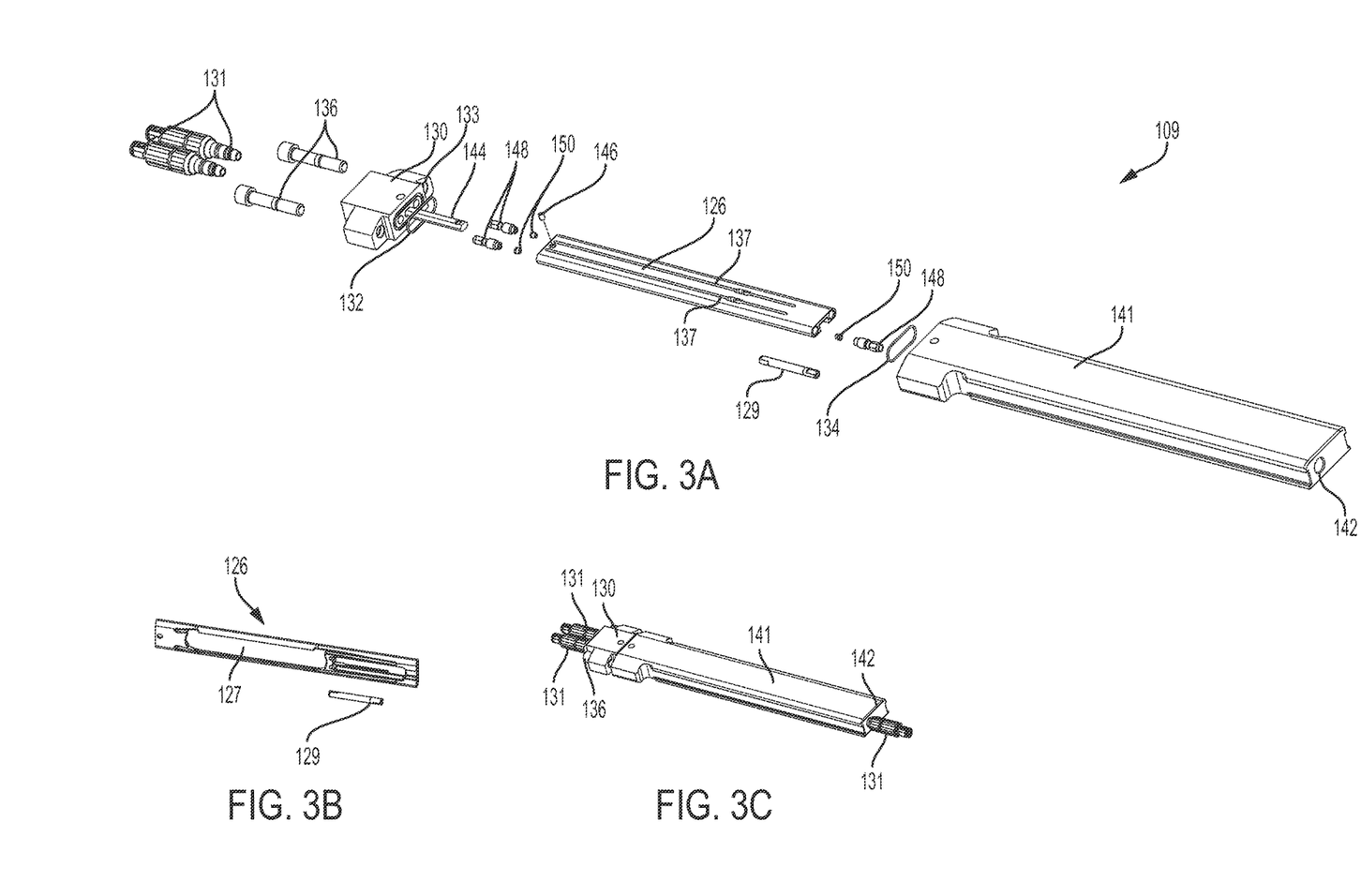
FIG. 3A is an exploded isometric view of a splice housing assembly, according to an aspect of the present disclosure.
FIG. 3B is another exploded isometric view of an underside of the racetrack tray of the splice housing assembly of FIG. 3A, according to an aspect of the present disclosure.
FIG. 3C is an isometric view of the assembled splice housing assembly of FIG. 3A, according to an aspect of the present disclosure.

FIG. 3A shows an exploded isometric view of a splice housing assembly 109, according to an aspect of the present disclosure. The splice housing assembly 109 includes a barrel racetrack housing 141 that includes the port 142. A cable extending from the surface, (e.g., the hybrid cable) can enter the splice housing assembly 109 through the port 142 in the barrel racetrack housing 141. The cable can enter the port 142 through an FMJ connector 131 mounted at the port 142 (shown in FIG. 3C). Fiber and electrical cable from downhole sensors and gauges can enter the splice housing assembly 109 via FMJ connectors 131 mounted at ports in the cap and arm assembly 130. In some aspects, additional ports can be included in the barrel racetrack housing 141 for receiving fiber and electrical cable from downhole sensors and gauges. The fiber and electrical cable can be separated immediately after entering the splice housing assembly 109 and can be positioned away from one another on the racetrack tray 126.

Inside the splice housing assembly 109, the FIMT of the hybrid cable can be restrained to the racetrack tray 126 by compression nuts 148 and compression ferrules 150. The compression nuts 148 can be screwed onto the ends of the racetrack tray 126 and the compression ferrules 150 can hold the inner metal tubing of the FIMT in place and prevent relative movement between the inner metal tubing and the outer tubing of the hybrid cable. In some aspects, other suitable compression fasteners can be used in place of the compression nuts and compression ferrules to secure the inner metal tubing of the FIMT in place. Relative movement between the outer tubing of the hybrid cable and the inner metal tubing of the FIMT can cause damage the fibers within the FIMT.

Fibers from downhole gauges or sensors can be passed into the splice housing assembly 109 through FMJ connectors 131 mounted in ports in the cap and arm assembly 130. The fibers from the downhole gauges and sensors can be laid in the racetrack tray 126 for connection to the fiber of the FIMT. In some aspects, the fibers of the FIMT and the fibers of the downhole gauges and sensors can be joined using fusion splicers and recoating tools or splice connectors. In other aspects, the fibers can be joined using miniature fiber connectors, or other means. The racetrack tray 126 can also permit crossovers for the fiber so that it can be routed in opposite directions.

The racetrack tray 126 can also include channels 137 that can extend along a length of the racetrack tray 126. The electrical cables of the hybrid cable and downhole gauges that are received by the splice housing assembly 109 can be positioned within the channels 137. The channels 137 can keep the electrical cables separate from the fibers and can position the electrical cables for connection to the crimp butt connector 129. An underside of the racetrack tray 126 is shown in FIG. 3B. The underside of the racetrack tray 126 can include the cavity 127. The fiber can be loosely wound and retained within the cavity 127. The racetrack tray 126 can also provide space for the crimp butt connector 129 for connecting the electrical cable to a gauge. In some aspects, another type of electrical connector can be used, for example, a double crimp butt connector for connecting the electrical cable to both a gauge and a wiring pass-through.

The electrical cable from the downhole gauge can center the splice housing assembly 109 through FMJ connectors 131 mounted in ports in the cap and arm assembly 130 for connection to the crimp butt connector 129.

The racetrack tray 126 can be positioned within the barrel racetrack housing 141 and the cap and arm assembly 130 can be secured and sealed to the opened end of the barrel racetrack housing 141. The cap and arm assembly 130 can include an arm 144 that extends out from a cap of the assembly 130. When the splice housing assembly 109 is assembled, the arm 144 can overlap with the racetrack tray 126. In some aspects, the arm 144 can overlap the racetrack tray 126 by approximately half an inch. The arm 144 can be secured to the racetrack tray 126 by a set screw 146 or other suitable fastener. The barrel racetrack housing 141 and cap and arm assembly 130 can be held together by a pair of threaded fasteners 136 (e.g., cap screws or other suitable fasteners). A pressure tight seal between the barrel racetrack housing 141 and the cap and arm assembly 130 can be formed by the c-seal 132 positioned within a groove 133 of the cap and arm assembly 130. The test seal 134 can be positioned in the groove on the barrel racetrack housing 141.

FIG. 3C shows an isometric view of the splice housing assembly 109 when assembled with the cap and arm assembly 130 secured to the barrel racetrack housing 141 by threaded fasteners 136. FMJ connectors 131 can be mounted at the port 142 in the barrel racetrack housing 141 and at the ports in the cap and arm assembly 130. In an aspect in which the barrel racetrack housing 141 includes a single port 142, the hybrid cable extending from the surface can enter the assembly 109 through the FMJ connector 131 mounted at the port 142. In some aspects, the barrel racetrack housing 141 can include multiple ports and the hybrid cable extending from the surface can enter the assembly 109 through one of the FMJ connectors 131 mounted at the ports in the cap and arm assembly 130.

Figure 4:
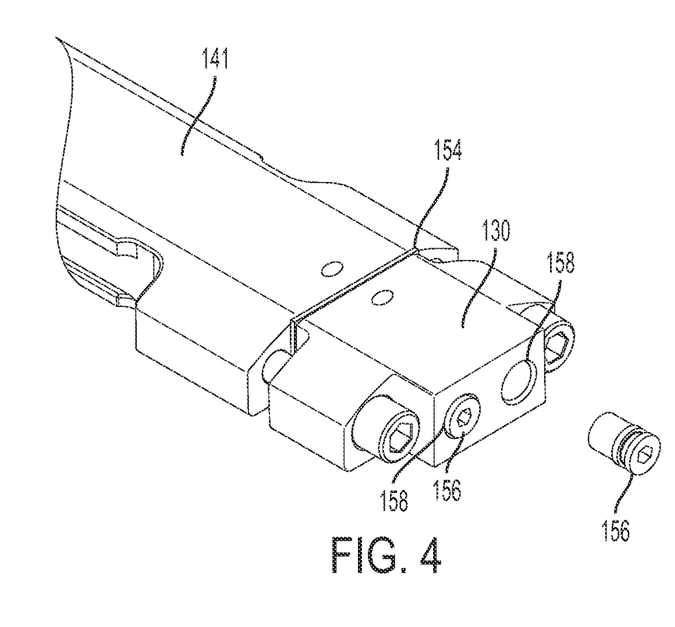
FIG. 4 is an isometric view of an end of the assembled splice housing assembly of FIG. 3A in a configuration for shipment, according to an aspect of the present disclosure.

FIG. 4 shows an isometric view of an end of the splice housing assembly 109 in a configuration for shipment, according to an aspect of the present disclosure. A protective sheet 154 can be positioned between the barrel racetrack housing 141 and the cap and arm assembly 130 to protect the surface of the barrel racetrack housing 141 and the cap and arm assembly 130 where the c-seals 132, 134 (shown in FIG. 3A) are mounted. In some aspects, the protective sheet 154 can include a material such as Teflon™, though other suitable protective materials can be used. In some aspects, plugs 156 can be inserted into the ports 158 of the cap and arm assembly 130 during shipping. At the well site, the plugs 156 can be removed and the FMJ connectors 131 or other suitable pressure testable compression fittings can be mounted.

Figure 5:
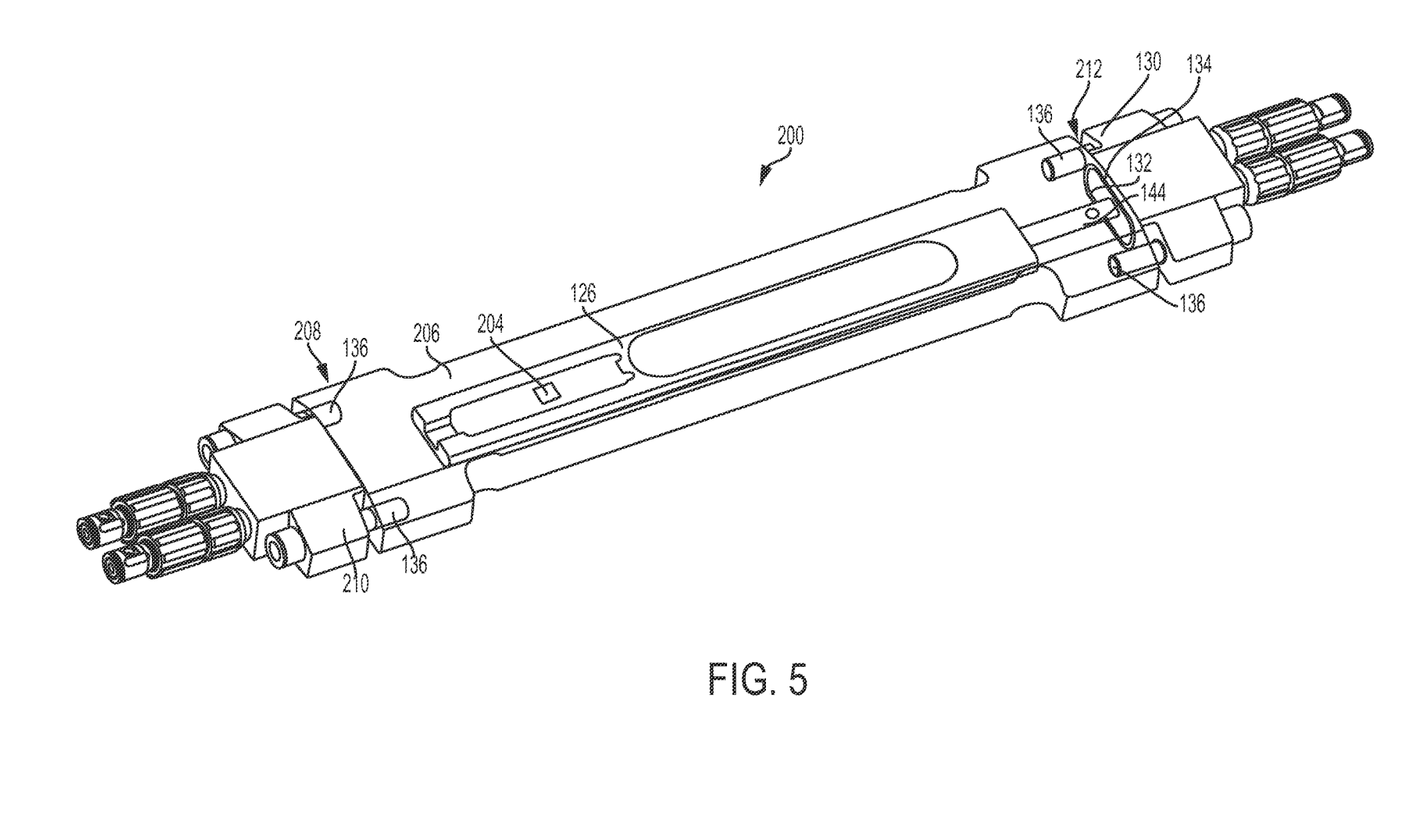
FIG. 5 is an isometric view of a splice housing assembly, according to an aspect of the present disclosure.

FIG. 5 shows a splice housing assembly 200, according to an aspect of the present disclosure. The splice housing assembly 200 is shown separate from a main body or mandrel. The splice housing assembly 200 can include a double crimp connector 204 positioned on the racetrack tray 126. The double crimp connector 204 can be for connecting the electrical cable of the hybrid cable to a gauge and to a pass-through wiring. The racetrack tray 126 and the double crimp connector 204 can be positioned within a double-ended barrel racetrack housing 206.

The double-ended barrel racetrack housing 206 can be opened on both ends. The double-ended barrel racetrack housing 206 can be pressure sealed at a first end 208 by a cap assembly 210, threaded fasteners 136, and a c-seal. In some aspects, the c-seal is positioned in a groove on the first end 208 of the double-ended barrel racetrack housing 206. In some aspects, the c-seal is positioned in a groove on the cap assembly 210. The double-ended barrel racetrack housing 206 can be pressure sealed at a second end 212 by the cap and arm assembly 130, the threaded fasteners 136, and the c-seals 132, 134. The racetrack tray 126 can be secured to the arm 144 of the cap and arm assembly 130 by a screw, though other suitable fasteners may be used. While the cap assembly 210 is shown in FIG. 5 without an arm extending into the double-ended barrel racetrack housing 206, in some aspects, the cap assembly 210 can also include an arm that can be secured to the racetrack tray 126 by a screw or other suitable fastener.

In some aspects, an assembly can include a barrel housing having an opened end. The barrel housing can also include a barrel port for mounting a first compression fitting. A racetrack tray can be positioned within the barrel housing. The racetrack tray can receive an optical fiber and an electrical cable of a hybrid cable. A cap can be secured to the opened end of the barrel housing. The cap can include a cap port for receiving a second compression fitting. A primary seal can be positioned in a groove on one of the cap or the barrel housing. The primary seal can create a pressure seal between the cap and the barrel housing.

In some aspects, an assembly can include a barrel housing having an opened end. The barrel housing can also include a first barrel port for mounting a first compression fitting and a second barrel port for mounting a second compression fitting. The assembly can include a racetrack tray positioned within the barrel housing for receiving an optical fiber and an electrical cable of a hybrid cable. A cap can be secured to the opened end of the barrel housing. The cap can also include a first cap port for mounting a third compression fitting and a second cap port for mounting a fourth compression fitting. A primary seal can be positioned in a groove on one of the cap or the barrel housing for creating a pressure seal between the cap and the barrel housing.

In some aspects, an assembly can include a barrel housing having an opened end. The barrel housing can include a barrel port for mounting a first compression fitting. The assembly can include a racetrack tray positioned within the barrel housing for receiving an optical fiber and an electrical cable of a hybrid cable. The racetrack tray can include a cavity for receiving an additional length of the optical fiber. A cap can be secured to the opened end of the barrel housing. The cap can include a cap port for mounting a second compression fitting. A primary seal positioned can be positioned in a first groove on one of the cap or the barrel housing for creating a pressure seal between the cap and the barrel housing. A test seal can be positioned in a second groove on the other of the cap or the barrel housing. The test seal can encircle the primary seal.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

That which is claimed is:

1. An assembly for use in a downhole environment comprising:
    a unitary barrel housing having an open end and a closed end, the closed end of the unitary barrel housing including a barrel port for mounting a first compression fitting;
    a racetrack tray positioned within the unitary barrel housing for receiving an optical fiber and an electrical cable of a hybrid cable;
    a cap secured to the open end of the unitary barrel housing, the cap including a cap port for receiving a second compression fitting; and
    a primary seal positioned in a groove on one of the cap or the unitary barrel housing for creating a pressure seal between the cap and the unitary barrel housing.

2. The assembly of claim 1, further comprising a fill port in the unitary barrel housing for inserting fluid into a cavity of the unitary barrel housing.

3. The assembly of claim 1, further comprising an electrical connector coupled to the racetrack tray for connecting the electrical cable of the hybrid cable to an electrical device.

4. The assembly of claim 1, wherein the racetrack tray includes a cavity for receiving an additional length of the optical fiber.

5. The assembly of claim 1, wherein the first compression fitting is for receiving the hybrid cable and wherein the second compression fitting is for receiving an optical fiber or an electrical cable of a device.

6. The assembly of claim 1, further comprising a compression nut and a compression ferrule for restraining an inner metal tube that houses the optical fiber to the racetrack tray.

7. The assembly of claim 1, further comprising an additional seal positioned in an additional groove on the other of the cap or the unitary barrel housing, wherein the additional seal surrounds the primary seal.

8. The assembly of claim 1, further comprising:
    an additional seal positioned in an additional groove on the other of the cap or the unitary barrel housing for testing a pressurization of the assembly; and
    a compressive fastener secured to an end of the racetrack tray for receiving and restraining an inner metal tube that houses the optical fiber to the racetrack tray, wherein the cap includes an arm that extends into the unitary barrel housing and is secured to the racetrack tray by a threaded fastener.

9. An assembly for use in a downhole environment, comprising:
    A unitary barrel housing having an open end, a closed end, and a first barrel port within the closed end for mounting a first compression fitting, and a second barrel port within the closed end for mounting a second compression fitting;
    a racetrack tray positioned within the unitary barrel housing for receiving an optical fiber and an electrical cable of a hybrid cable;
    a cap secured to the open end of the unitary barrel housing, the cap including a first cap port for mounting a third compression fitting and a second cap port for mounting a fourth compression fitting, wherein the cap includes an arm that extends into the unitary barrel housing and is secured to the racetrack tray by a threaded fastener; and
    a primary seal positioned in a groove on one of the cap or the open end of the unitary barrel housing for creating a pressure seal between the cap and the unitary barrel housing.

10. The assembly of claim 9, wherein the first compression fitting mounted to the first barrel port is for receiving the hybrid cable.

11. The assembly of claim 9, wherein the third compression fitting mounted to the first cap port is for receiving one of an optic fiber or an electric cable of a device.

12. The assembly of claim 9, further comprising a fill port in the unitary barrel housing for inserting a fluid into a cavity of the unitary barrel housing.

13. The assembly of claim 9, further comprising:
a compressive fastener secured to an end of the racetrack tray for receiving and restraining an inner metal tube that houses the optical fiber to the racetrack tray.

14. The assembly of claim 9, further comprising an electrical connector positioned on the racetrack tray for connecting the electrical cable to an electrical device.

15. An assembly for use in a downhole environment, comprising:
a unitary barrel housing having an open end and a closed end, the closed end of the unitary barrel housing including a barrel port for mounting a first compression fitting;
a racetrack tray positioned within the unitary barrel housing for receiving an optical fiber and an electrical cable of a hybrid cable, the racetrack tray including a cavity for receiving an additional length of the optical fiber;
a cap secured to the open end of the unitary barrel housing, the cap including a cap port for mounting a second compression fitting;
a primary seal positioned in a first groove on one of the cap or the unitary barrel housing for creating a pressure seal between the cap and the unitary barrel housing; and
a test seal positioned in a second groove on the other of the cap or the unitary barrel housing, the test seal encircling the primary seal.

16. The assembly of claim 15, wherein the unitary barrel housing includes an additional barrel port for mounting a third compression fitting.

17. The assembly of claim 15, further comprising a test port in the cap for testing a pressurization of a region between the primary seal and the test seal.

18. The assembly of claim 15, further comprising a fill port in the unitary barrel housing for inserting a fluid into a cavity of the unitary barrel housing.

19. The assembly of claim 15, further comprising an electrical connector coupled to the racetrack tray for connecting the electrical cable to an electrical device.

20. The assembly of claim 15, further comprising:
a compressive fastener secured to an end of the racetrack tray for receiving and restraining an inner metal tube that houses the optical fiber to the racetrack tray, wherein the cap includes an arm that extends into the unitary barrel housing and is secured to the racetrack tray by a threaded fastener.

* * * * *